US012584760B2

(12) United States Patent (10) Patent No.: US 12,584,760 B2
Miyatani et al. (45) Date of Patent: Mar. 24, 2026

(54) INFORMATION PROCESSING APPARATUS, INFORMATION PROCESSING METHOD, AND MEDIUM

(71) Applicant: CANON KABUSHIKI KAISHA, Tokyo (JP)

(72) Inventors: Sonoko Miyatani, Tokyo (JP);
Masakazu Fujiki, Kanagawa (JP);
Daisuke Kotake, Kanagawa (JP);
Akiteru Naka, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 205 days.

(21) Appl. No.: 18/058,434

(22) Filed: Nov. 23, 2022

(65) Prior Publication Data

US 2023/0168103 A1 Jun. 1, 2023

(30) Foreign Application Priority Data

Nov. 30, 2021 (JP) ................................. 2021-194639

(51) Int. Cl.
G01C 21/30 (2006.01)
G01C 21/36 (2006.01)
(Continued)

(52) U.S. Cl.
CPC ......... G01C 21/3667 (2013.01); G01C 21/30 (2013.01); G01C 21/3697 (2013.01);
(Continued)

(58) Field of Classification Search
CPC ............................ G01C 21/3667; G01C 21/30; G01C 21/3697; G06T 7/74; G06T 11/203;
(Continued)

(56) References Cited

U.S. PATENT DOCUMENTS 9,242,378 B2 * 1/2016 Matsumoto .......... G05D 1/0274
2004/0168148 A1 * 8/2004 Goncalves ........... G05D 1/0231
717/104

(Continued)

FOREIGN PATENT DOCUMENTS

CN 112926616 A * 6/2021 ............. G06F 18/22
JP 2021099384 A 7/2021
JP 2021139785 A 9/2021

OTHER PUBLICATIONS

Yicheng Li, Visual Map-Based Localization for Intelligent Vehicles From Multi-View Site Matching, Jan. 10, 2020, IEEE Transactions on Intelligent Transportation Systems vol. 22, Issue: 2 (Year: 2020).*

(Continued)

*Primary Examiner* — Matthias S Weisfeld
(74) *Attorney, Agent, or Firm* — Canon U.S.A., Inc. IP Division

(57) ABSTRACT

An information processing apparatus includes one or more computer-readable storage media and one or more processors in communication with the one or more computer-readable storage media. The one or more processors and the one or more computer-readable storage media are configured to acquire a plurality of map elements from a storage unit configured to store three-dimensional map information based on the plurality of map elements, each of which includes an image captured by an imaging apparatus mounted on a vehicle and also includes position information indicating a position of the imaging apparatus by which the image is captured, make a determination to detect a map element including an image captured at a position where wrong position is likely to be estimated in a localization of the imaging apparatus, and generate display data for distin- (Continued)

guishably displaying the position indicated by the position information included in the detected map element.

10 Claims, 8 Drawing Sheets

(51) Int. Cl.
    *G06T 7/73*             (2017.01)
    *G06T 11/20*        (2006.01)

(52) U.S. Cl.
    CPC .............. *G06T 7/74* (2017.01); *G06T 11/203* (2013.01); *G06T 2207/20101* (2013.01); *G06T 2207/30244* (2013.01); *G06T 2207/30252* (2013.01)

(58) Field of Classification Search
    CPC . G06T 2207/20101; G06T 2207/30244; G06T 2207/30252

USPC ......................................................... 701/438
See application file for complete search history.

(56) References Cited

U.S. PATENT DOCUMENTS

| | | | |
|---|---|---|---|
| 2009/0226113 A1* | 9/2009 | Matsumoto ............ | G06V 20/36 |
| | | | 382/284 |
| 2019/0220678 A1* | 7/2019 | Guo ........................... | G06T 7/73 |
| 2021/0200237 A1* | 7/2021 | Kesten ................. | G05D 1/0274 |

OTHER PUBLICATIONS

Raul Mur-Artal, et al.; ORB-SLAM: a Versatile and Accurate Monocular SLAM System; IEEE Transactions on Robotics; http://ieeexplore.ieee.org/xpl/articleDetails.jsp?arnumber=7219438; Sep. 2015; pp. 1-17.

* cited by examiner

FIG. 5

INFORMATION PROCESSING APPARATUS, INFORMATION PROCESSING METHOD, AND MEDIUM

BACKGROUND

Field of the Disclosure

The present disclosure relates to a technique of generating map information relating to a map of an environment where a vehicle moves.

Description of the Related Art

SLAM (Simultaneous Localization and Mapping) technology is known as a method for estimating the position and the orientation of a vehicle from information acquired by a sensor such as a camera, a distance sensor, or the like, mounted on the vehicle. In SLAM technology, a process of generating a three-dimensional environment map for grasping information on the positions of surrounding objects, and a self-position/orientation estimation process using the environment map are performed simultaneously in parallel. The three-dimensional environment map includes map elements (also referred to as keyframes). M. A. Raul (ORB-SLAM, A Versatile and Accurate Monocular SLAM System, 2015) discloses a process called relocalization which is performed, when a self-position/orientation estimation fails, for recovery to the self-position/orientation estimation. In the relocalization, to estimate the current self position and orientation, a three-dimensional environment map is broadly searched for map elements that contain information similar to the information (for example, image) acquired by a sensor at the current position/orientation.

However, in the method disclosed by M. A. Raul (ORB-SLAM: A Versatile and d Accurate Monocular SLAM System, 2015), when a plurality of similar map elements exist, there is a possibility that a map element located far away from the current position is selected, which may lead to an incorrect localization.

Japanese Patent Laid-Open No. 2021-139785 discloses a method that prompts a user to select information that has to have been acquired by a sensor at a current position of the sensor from among map elements that include information similar to information acquired by the sensor at the current position of the sensor. However, the method disclosed in Japanese Patent Laid-Open No. 2021-139785 only informs the user that there are map elements containing information similar to the information obtained by the sensor at the current position of the sensor at the timing when a closed route is almost formed.

SUMMARY

In view of the above, the present disclosure provides a technique of indicating, in an easy-to-understand manner, a position where wrong position is likely to be estimated in the localization.

According to an aspect, the present disclosure provides an information processing apparatus including one or more computer-readable storage media, and one or more processors in communication with the one or more computer-readable storage media, wherein the one or more processors and the one or more computer-readable storage media are configured to acquire a plurality of map elements from a storage unit configured to store three-dimensional map information based on the plurality of map elements, each of which includes an image captured by an imaging apparatus mounted on a vehicle and also includes position information indicating a position of the imaging apparatus by which the image is captured, make a determination to detect a map element including an image captured at a position where wrong position is likely to be estimated in a localization of the imaging apparatus, and generate display data for distinguishably displaying the position indicated by the position information included in the map element detected in the determination.

Further features of various embodiments will become apparent from the following description of exemplary embodiments with reference to the attached drawings.

BRIEF DESCRIPTION OF THE DRAWINGS

FIG. 5 shows a second example of a generated image.

DESCRIPTION OF THE EMBODIMENTS

First Embodiment

In SLAM technology, a process of generating three-dimensional map information for grasping information on positions of objects existing in an environment is performed simultaneously with a localization process using the map information (note that an orientation may also be estimated in the localization process). The three-dimensional information includes map elements (also referred to as keyframes). When the degree of matching of an image included in a moving image taken for generating the three-dimensional map information with respect to an image included in an existing map element becomes lower than a threshold value, a new map element is added to the three-dimensional map information. In an apparatus that performs the SLAM processing, the localization of an imaging apparatus mounted on a vehicle is made by matching image features obtained from images of the environment captured by the imaging apparatus mounted on the vehicle with image features obtained from map elements included in pre-generated three-dimensional map information. The vehicle is, for example, an AGV (Automatic Guides Vehicles), an AMR (Autonomous Mobile Robot), a small mobile machine (such as a cleaning robot), an autonomous vehicle, a drone, or the like. The positional relationship between the imaging apparatus and the vehicle is known, and thus it is possible to estimate the position of the vehicle by converting the position of the imaging apparatus to the position of the vehicle.

In the apparatus configured to control the movement of the vehicle using the SLAM technology, when recovery from a failure in the localization is performed or when the localization is started, the following are performed repeatedly until it becomes possible to perform the localization:

changing the current position of the vehicle, capturing an image of an environment, and searching for a map element including an image similar to the captured image.

The failure of the localization refers to a situation in which a map element containing an image that can be regarded as partially matching an image captured at the current position cannot be retrieved from map elements that make up three-dimensional map information. In a case where there are a plurality of map elements each containing an image similar to the image captured at the current position, there is a possibility that a position indicated by a map element different from a map element corresponding to the current position is incorrectly selected as the current position, which results in wrong position estimation in the localization.

Figure 4:
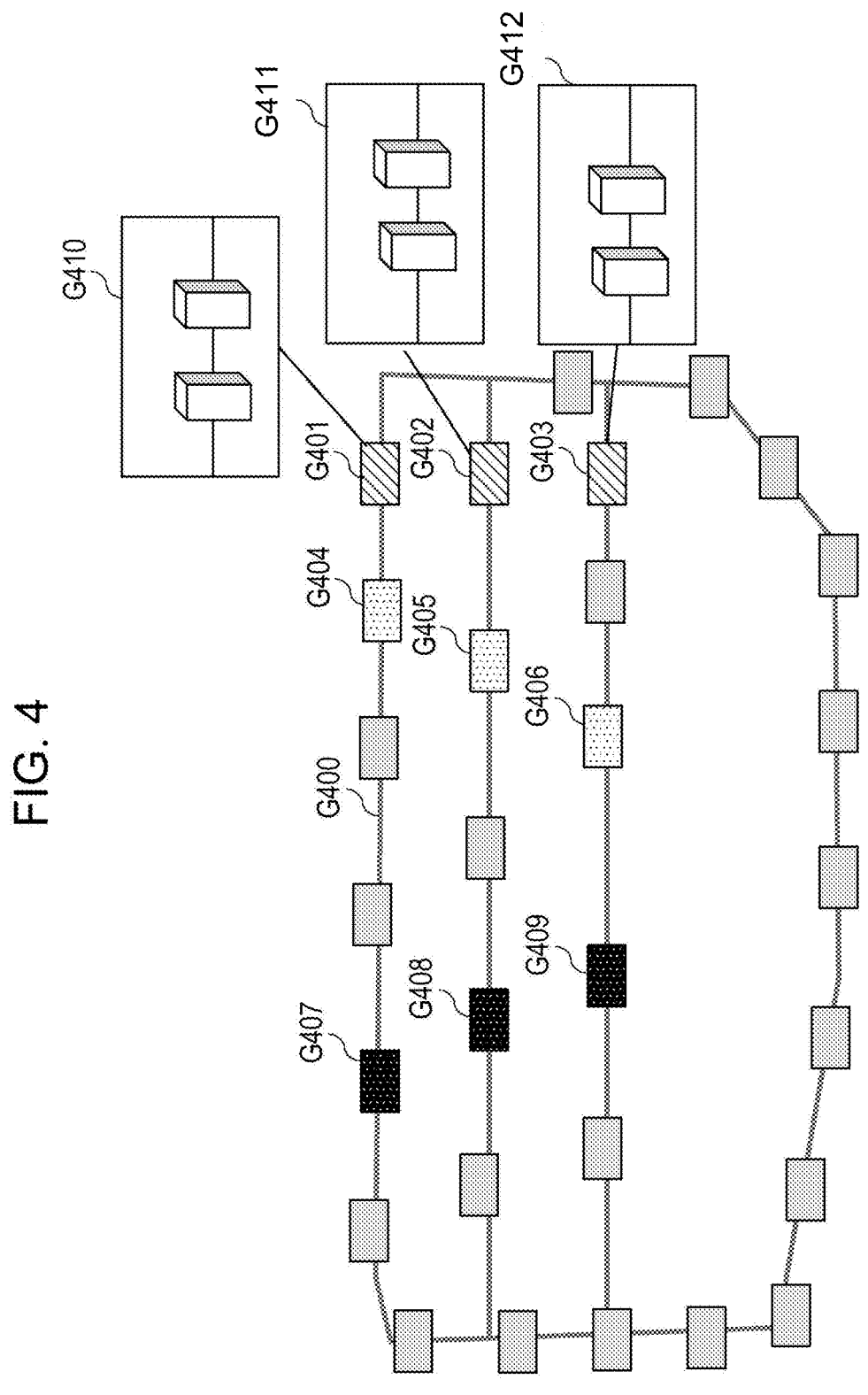
FIG. 4 shows a first example of a generated image.

In view of the above, in the present embodiment, a determination is made for each map element of interest as to whether there is another map element including an image similar to an image of the map element of interest, and data is generated which is to be displayed so as to be superimposed on a map indicating positions of the camera where images included in the respective map elements are captured. An example of the map is shown in FIG. 4, which will be described in further detail later. When recovering from a localization failure is performed or when the localization is started, this map is presented to the user to inform the user of positions where wrong position is likely to be estimated in the localization. By generating such a map, for example, it becomes possible to guide the user not to select a recovery start position where there is a possibility that wrong position estimation occurs in the localization, thereby making it possible to easily suppress errors in localization.

Figure 8:
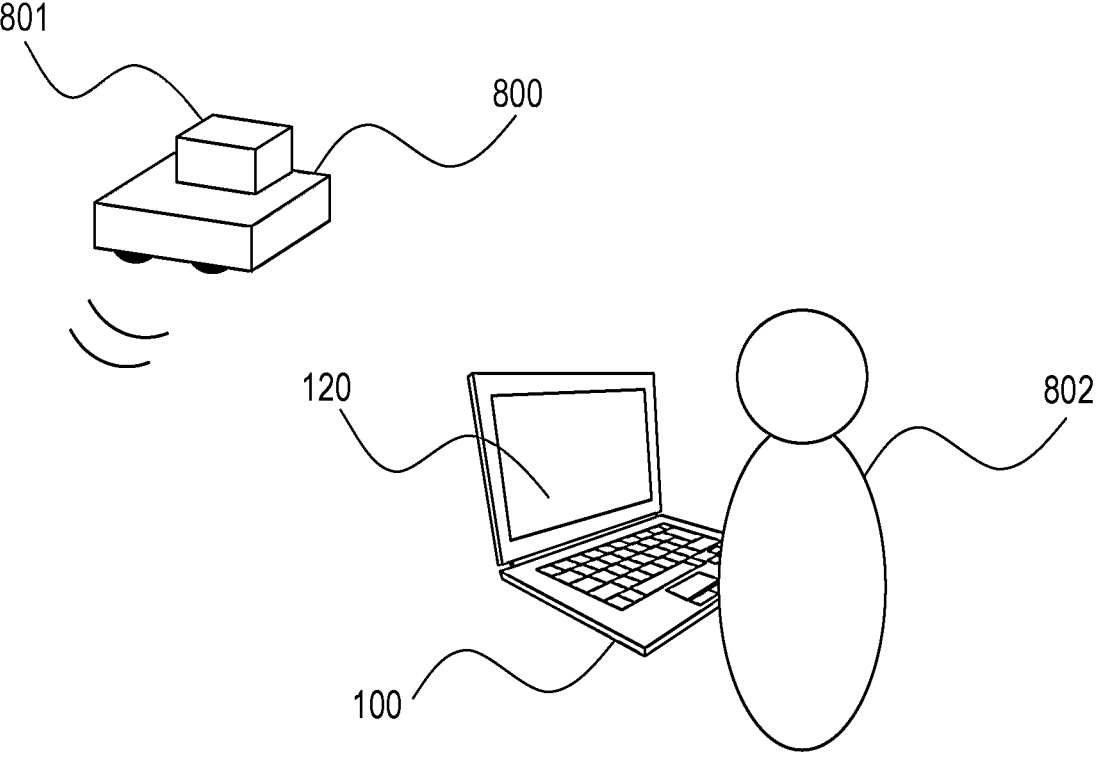
FIG. 8 is a diagram showing an example of a scene in which an information processing apparatus is used.

FIG. 8 is a diagram showing an example of a scene in which the information processing apparatus 100 according to the present embodiment is used. Three-dimensional map information of an environment is generated in advance by capturing images of the environment by the imaging apparatus 801 while the vehicle 800 moves. A user 802 is looking at a screen of the display apparatus 120 of the information processing apparatus 100 (for example, a notebook type computer). A map, such as that shown in FIG. 4, generated according to the present embodiment is displayed on the display apparatus 120. Based on the information displayed on the screen of the display apparatus 120, the user 802 grasps the position where wrong position is likely to be estimated in the localization.

Figure 1:
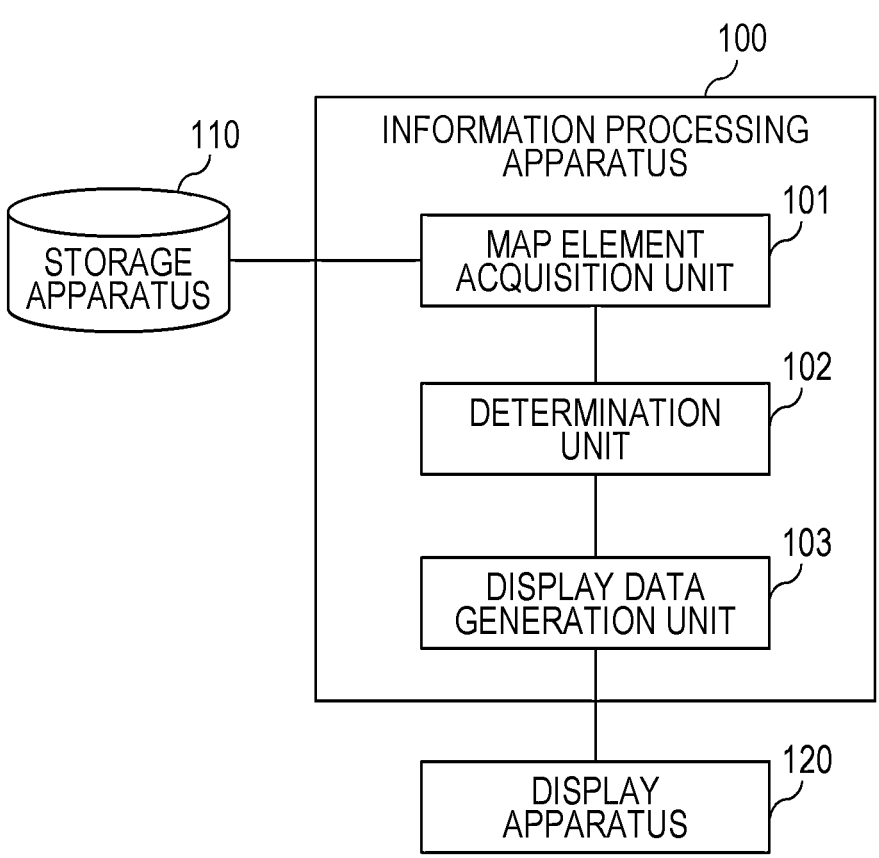
FIG. 1 is a block diagram showing an example of a functional configuration of an information processing apparatus according to one of first to third embodiments.

FIG. 1 is a diagram showing an example of a configuration according to the present embodiment. In this configuration, there are provided an information processing apparatus 100, a storage apparatus 110, and a display apparatus 120. The storage apparatus 110 stores three-dimensional map information for the localization. The map information includes a plurality of map elements. The three-dimensional map information can be visualized as a series of map elements (keyframes). Details of the map elements will be described later. The display apparatus 120 displays data generated by the information processing apparatus. The information processing apparatus 100 transmits data to and receives data from an apparatus having the storage apparatus 110 via a communication interface. The storage apparatus 110 and/or the display apparatus 120 may be disposed inside the information processing apparatus 100. For example, as shown in FIG. 8, the information processing apparatus 100 is a personal computer brought to a site, such as a factory, to perform information processing on the personal computer. In a case where the information processing apparatus 100 is a server apparatus located remotely, information processing is performed on the server apparatus. In this case, data processed by the server apparatus (the information processing apparatus 100) is transmitted and received via a communication network between the personal computer used by a user in a factory or the like and the server apparatus (the information processing apparatus 100). Hereinafter, it is assumed by way of example that the information processing apparatus 100 is an apparatus different from an apparatus that controls the movement of the vehicle, and the information processing apparatus 100 is used to perform information processing.

The information processing apparatus 100 and the apparatus that performs the localization for controlling the movement of the vehicle exchange information with each other via a wired or wireless communication network. The information processing apparatus 100 and the apparatus that performs the localization for controlling the movement of the vehicle may be disposed in one of the following three manners: both are mounted on the vehicle; one of them is mounted on the vehicle; and both are disposed outside the vehicle without being mounded on the vehicle.

The information processing apparatus 100 includes functional blocks including a map element acquisition unit 101, a determination unit 102, and a display data generation unit 103.

The map element acquisition unit 101 acquires a plurality of map elements from the storage apparatus 110 via the communication interface.

The determination unit 102 determines whether map elements include images captured at positions where wrong position is likely to be estimated in the localization by calculating the degree of similarity of each map element (a first map element) acquired by the map element acquisition unit 101 with respect to each of other map elements (2nd to n-th map elements). Of course, conversely, a determination may be made to detect map elements including images captured at positions where wrong position estimation is not likely to occur in the localization. A method of calculating the degree of similarity will be described later. Note that instead of calculating the degree of similarity each time, information regarding similar map elements may be stored in a storage apparatus provided in the information processing apparatus 100, and the information is acquired from the storage apparatus, and, according to the acquired information, it may be determined whether positions indicated by map elements are positions where wrong position is likely to be estimated in the localization.

The display data generation unit 103 generates data to be presented to a user based on information on the degree of similarity calculated by the determination unit 102, or the like. The generated data is output to the display apparatus 120. It is assumed that the data is image data. Details of the image to be generated are described later.

Next, the map elements stored in the storage apparatus 110 are described. Each map element is a key frame that associates an image of the environment captured by a camera mounted on the vehicle and its image feature with position information indicating the position of the camera. Each map element may also be associated with the orientation information of the camera. The camera captures a moving image of an environment. When the degree of similarity between an image in the moving image and images included in the existing map elements becomes equal to or lower than a threshold value, a new map element is added to the three-dimensional map information. The vehicle and the apparatus having the storage apparatus 110 can communicate with each other via a communication interface. The storage apparatus 110 is located, for example, in an information processing apparatus on a cloud network. Such three-dimensional map information is generated in advance and stored in the storage apparatus 110 or a storage unit disposed in the information processing apparatus 100. The calculation of the map elements and the method of performing the localization of the camera using the map elements are described in detail in the non-patent document by M. A. Raul (ORB-SLAM, A Versatile and Accurate Monocular SLAM System, 2015), and thus a further description thereof is omitted here. In a case where an environment is measured by a measurement apparatus, such as Lidar (Light Detection and Ranging) or the like, the map elements include three-dimensional shape information. In this case, the determination unit 102 determines the similarity of the three-dimensional shape information.

Figure 2:
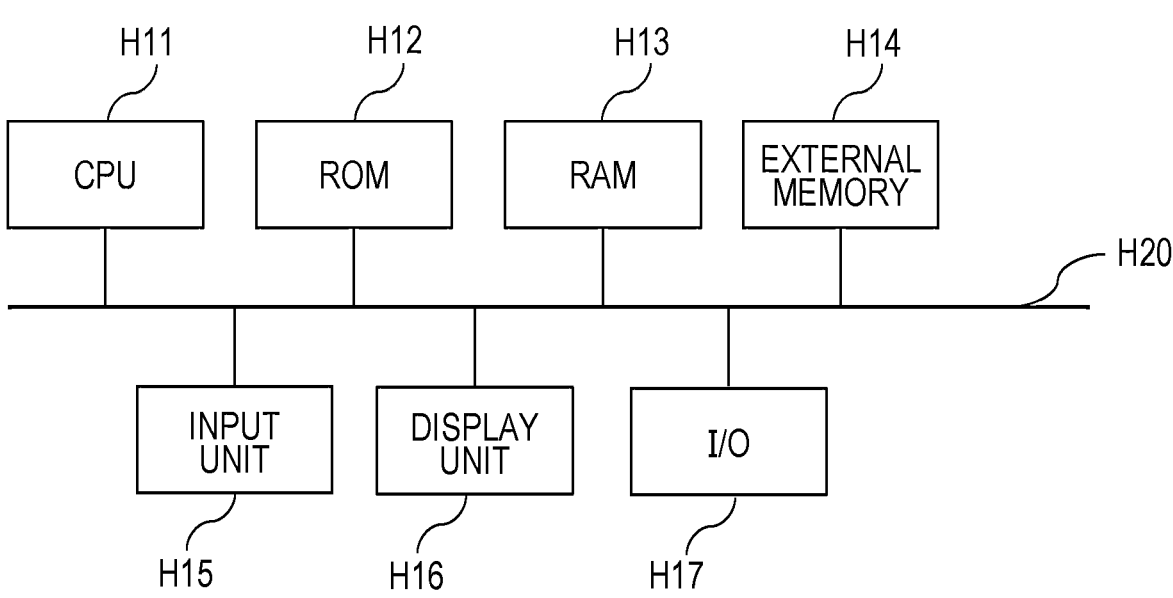
FIG. 2 is a diagram illustrating a hardware configuration of an information processing apparatus.

FIG. 2 is a diagram showing a hardware configuration of the information processing apparatus 100. A CPU H11 controls various devices connected to a system bus H20. A ROM H12 stores a BIOS program and boot program. A RAM H13 is used as a main memory by the CPU H11. An external memory H14 stores a program executed by the information processing apparatus 100. An input unit H15 is a keyboard, a mouse, a robot controller, or the like, which performs processing related to inputting of information or the like. In a case where the information processing apparatus 100 also has a display function, the display unit H16 outputs a result of a calculation performed by the information processing apparatus 100 to a display apparatus under the control of the CPU H11. The display apparatus may be of any type, such as a liquid crystal display apparatus, a projector, or an LED indicator. A communication interface H17 performs information communication via a network. The communication interface H17 may be of any type based on, for example, Ethernet, USB, serial communication, wireless communication, or the like.

Figure 3:
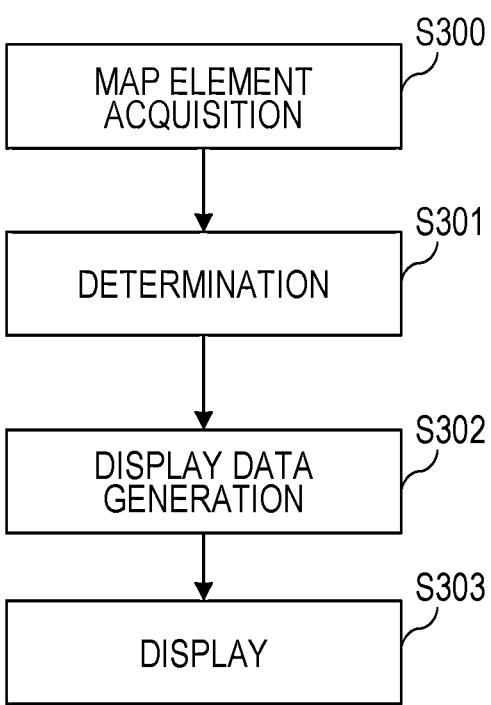
FIG. 3 is a flowchart showing a process executed by an information processing apparatus according to one of the first to third embodiments.

FIG. 3 is a flowchart showing a processing procedure according to the present embodiment. The process illustrated in FIG. 3 is started when the user instructs to display a map, such as that shown in FIG. 4, for example, when recovery from a failure of localization is performed or when the localization is started. It is assumed that the process shown in the flowchart is realized by the CPU by executing a control program. The processing steps include a map element acquisition step S300, a determination step S301, and a display data generation step S302. In a case where the information processing apparatus 100 does not have a display function, a processing step S303 is not performed. Each processing step will be described in detail below.

In step S300, a plurality of map elements are acquired from the storage apparatus 110. The map elements have been described in detail above.

In step S301, a determination is made as to similarity among the plurality of map elements acquired in step S300, thereby determining whether there is a map element including an image captured at a position where wrong position is likely to be estimated in the localization of the imaging apparatus. Note that the degree of similarity between map elements is defined by the degree of similarity between images of map elements. The degree of similarity is calculated by a method based on BoW (Bag of Words).

More specifically, feature vectors are extracted from the respective images, and the degree of similarity of the feature vector is calculated and the degree of similarity of the image is defined by the degree similarity of the feature vector. The degree of similarity between two feature vectors is given by the inner product of the feature vectors. The degree of similarity is calculated not for all possible pairs of map elements stored in the storage apparatus 110 but only for particular pairs of map elements between which the distance calculated based on the position/orientation of the camera is equal to or greater than a predetermined threshold value. For example, when the distance between map elements is greater than or equal to the threshold value, if the degree of similarity between images is greater than a threshold value, wrong position is likely to be estimated in the localization. That is, such a situation is undesirable. Conversely, when the distance between map elements is smaller than or equal to the threshold value (or when the distance is smaller than the threshold value), images at these map elements are obtained by capturing a common environment and thus it is natural that the degree of similarity is high. In this case, the high degree of similarity does not cause wrong position estimation in the localization. Therefore, in S301, the calculation of the degree of similarity is not performed for such map elements. Details of BoW are disclosed in M. A. Raul (ORB-SLAM, A Versatile and Accurate Monocular SLAM System, 2015). In S301, the determination as to whether the position is a position where wrong position is likely to be estimated in the localization may be made based on pre-stored information indicating similar map elements.

In step S302, data to be presented to the user is generated based on the determination result in step S301. The generated data is output to the display apparatus 120. It is assumed that the data is image data. The method of generating the image will be described later.

In step S303, the image generated in step S302 is presented to the user by displaying it on the display apparatus 120.

Next, a method of generating an image in step S302 is described. In this step S302, a map image is generated which indicates the positions of the camera where the images included in the respective map elements acquired in step S300 are captured, and CG marks are superimposed on the map image so as to indicate positions of similar map elements.

First, a method of generating a map image is described. The positions of the camera where the images included in the respective map elements acquired in step S300 are captured are converted into the coordinates of the two-dimensional images, and different pixels values are assigned to positions depending on whether the positions are such positions where images are captured by the camera or the other positions. For example, gray pixel values are assigned to the positions where images included in the map elements are captured by the camera, and white pixel values are assigned to the other positions. The position of the camera where the images included in the map elements are captured can be converted into coordinates of a two-dimensional image as follows. In a case where the positions of the camera where the images included in the map elements are captured are represented in three-dimensional coordinates, each position is projected onto a two-dimensional plane, thereby converting the three-dimensional coordinates into two-dimensional coordinates. For example, in a case where an image included in a map element is captured by the camera at a position $(x, y, z)$, the position is converted into $(x, y)$. Next, the reduction ratio s of the coordinate values and the translation $(tx, ty)$ of the coordinate values are determined such that the positions fall within the size of the map image to be generated, and the coordinates $(sx+tx, sy+ty)$ obtained as a result of applying the reduction ratio s and the translation $(tx, ty)$ are employed as the positions on the map image. That is, the positions of the map elements (keyframes) making up the three-dimensional map information are converted such that the positions are within the size of a newly generated two-dimensional map image. Different colors (for example, gray and white) are assigned to positions depending on whether the positions are positions where map elements exist or the other positions.

Next, a method of superimposing CG marks on the map image to indicate positions of similar map elements is described. Similar map elements refer to such map elements whose degree of vector similarity is equal to or greater than a predetermined value among the degrees of similarity calculated in step S302, or such map elements whose similarity is tabulated in advance. A common CG mark is generated for each group of similar map elements and is superimposed on areas including image positions of these map elements. The CG marks are patterns, such as rectangles, circles, or the like, indicating the positions of map elements. In addition to the patterns, images of similar map elements may be displayed. By displaying these CG marks, it is possible to distinguishably indicate positions where wrong position is likely to be estimated in the localization of the imaging apparatus.

An example of a generated map image is shown in FIG. 4. G400 denotes camera positions where images included in respective map elements are captured wherein the camera positions (x, y) are converted into (sx+tx, sy+ty) so as to fit a map image size, and the camera positions are connected by line segments in temporal order of capturing the images included in the map elements. G401, G402, and G403 each are a common CG mark for indicating similar map elements, and each CG mark is superimposed on an area including a position (sx+tx, sy+ty) of a corresponding map element on the map. Similarly, rectangular patterns of G404, G405, and G406, and rectangular patterns G407, G408, and G409 are CG marks indicating similar map elements. G410, G410, and G411 denote images included in map elements respectively corresponding to G401, G402, and G403. Note that gray rectangles other than G401 to G409 shown in FIG. 4 do not indicate similar map elements, but indicate positions of map elements which are not similar to each other.

Note that in a case where a plurality of similar map elements exist within a range of a predetermined distance, only one CG mark with a size that covers the range is generated instead of generating a separate CG mark for each map element, and the only one CG mark is superimposed on an image of the area.

The map image shown in FIG. 4 is merely an example. For example, a floor map of a facility, such as a factory, or a two-dimensional CAD drawing of a factory may be generated, and data indicating elements on such a map or drawing may be generated in a similar manner as described above. In the floor map of the facility such as the factory or the CAD drawing of the factory, a layout of objects existing in an environment is indicated. The display data for displaying marks similar to G401 to G409 or G410 to G412 is generated and superimposed on the floor map of the facility such as the factory or the CAD drawing of the factory.

By applying the method according to the first embodiment, a user can know image-capturing positions where there is a possibility that wrong position estimation occurs in the localization when recovering from a failure of localization is performed or the localization is started. This makes it possible to avoid capturing an image at such a position, and thus it becomes possible to easily suppress an occurrence of wrong position estimation in the localization. In addition, to handle the above situation, objects that provide distinguishable image features, such as posters or safety cones, may be placed at positions where wrong position is likely to be estimated in the localization.

In step S302, a CG mark, such as a circle, may be superimposed on the map image to indicate the current position of the vehicle. In this case, a user may change the position of the vehicle 800 by dragging the CG mark displayed on the display apparatus 120. More specifically, the direction and amount of movement of the vehicle 800 determined according to the direction and amount of movement of the CG mark on the display screen are transmitted to the server apparatus (the information processing apparatus 100) via the communication network. The information on the direction and amount of movement of the vehicle 800 are further transmitted from the server apparatus (the information processing apparatus 100) to the apparatus that controls the movement of the vehicle. The apparatus changes the position of the vehicle 800 according to the received information on the direction and amount of movement of the vehicle 800.

Modification 1-1

In the first embodiment described above, in step S301, the degree of similarity between an image included in a map element and an image of each of the other map elements is calculated. In addition to this, the ranking of the degree of similarity may be calculated. The ranking is determined based on the average value of degrees of similarity of all vectors. The higher the average value, the higher the rank. Note that instead of the average value, any other value may be employed as long as it can indicate the ranking. For example, the maximum value or the median value of the similarities among all vectors may be employed.

In step S302, an image is generated which represents the positions of similar map elements and the ranking of similarity. The image may be generated by the method described above with reference to step S302 according to the first embodiment or such that numerical values indicating the rankings of the similarity are displayed near the positions of the images of the map elements. Alternatively, the rankings may be indicated by CG mark colors. For example, a darker CG mark color may indicate a higher ranking.

Modification 1-2

In the first embodiment described above, in step S301, the degree of similarity is calculated for all map elements. Alternatively, in a modification 1-2 described below, for example, a map element may be specified on a three-dimensional environment map displayed on a display, and the degree of similarity between the specified map element and the other map elements may be calculated and an image representing the calculated degree of similarity may be generated.

In step S301, it is determined whether the image included in the specified map element is similar to one or more other map elements, and this specified map element is at a position where wrong position is likely to be estimated in the localization. The degree of similarity may be calculated in the same manner as described in the first embodiment.

In step S302, an image representing the information determined in step S301 is generated.

Figure 5:
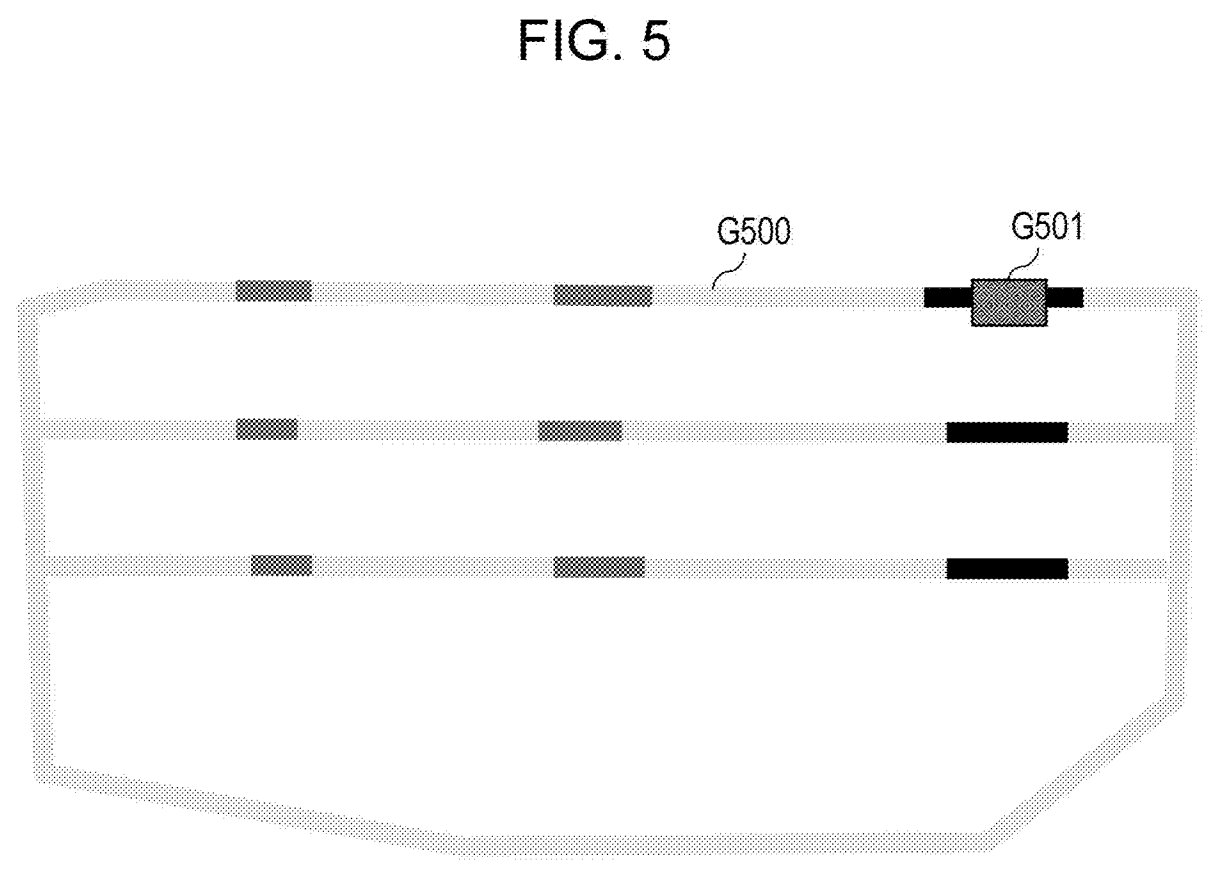

More specifically, a map image is generated in step S302 by the method described above in the first embodiment. In this process, based on the degree of similarity, the pixel value is set at the position on the map image corresponding to the camera position where the image included in the map element is captured. For example, the pixel value is set such that the higher the degree of similarity, the darker the color. An example of a generated map image is shown in FIG. 5.

G501 indicates the specified map element. For convenience of illustration, the other map elements shown in FIG. 4 are omitted. G500 indicates the positions of the camera where the images included in the respective map elements are captured. In this diagram, the degrees of similarity are represented by the gradations of color. Here, the darker the color, the higher the degree of similarity. In FIG. 5, colors are displayed in three levels of color gradation. Note that the colors indicating the degrees of similarity may be displayed in a greater number of gradation levels. By the color gradation levels, it is possible to distinguishably indicate positions where wrong position is likely to be estimated in the localization of the imaging apparatus (the vehicle).

Positions specified on the three-dimensional environment map displayed on the display are not limited to positions corresponding to map elements, but any position on the three-dimensional environment map may be specified. In this case, a map element closest to the specified position is searched for, and processing is performed as the same manner as when the retrieved map element is specified.

Modification 1-3

In the first embodiment described above, in calculating the degree of similarity in step S302, a feature vector is extracted from each image, and the degree of similarity of the feature vector is calculated as the degree of similarity of the image. The method of calculating the degree of similarity is not limited to this, and another method of calculating the degree of similarity between images may be used. For example, the average brightness of all pixels in an image may be calculated, and the reciprocal of the difference in the average brightness may be used as the degree of similarity. In this case, the higher the degree of similarity value, the more similar the two images are. Alternatively, the Hamming distance between image feature values of images may be calculated for each of all image feature values, and the number of features whose Hamming distance is smaller than a predetermined value may be employed as the degree of similarity. The Hamming distance here is given by the sum of differences in feature values between elements of interest. Also in this case, the higher the degree of similarity value, the more similar the two images are. Also, the similarity between images may be determined based on whether the number of feature points having similar SIFT (Scale Invariant Feature Transform) features or the like is equal to or greater than a threshold.

Modification 1-4

In the first embodiment described above, in step S303, it is assumed that the display data is image data. However, the display data is not limited to image data, and any data may be used as long as it distinguishably indicates the degree of similarity of images included in map elements. For example, colored three-dimensional point cloud data indicating the degree of similarity of an image with respect to the imaging position of the camera may be used. In this case, the maps shown in FIGS. 4 to 7 are three-dimensional maps. The color of each point cloud is based on the degree of similarity. Also, the display data may be numerical data indicating the position of each map element or the positions of similar map elements.

Modification 1-5

In the first embodiment described above, the images superimposed on the map image are patterns functioning as marks indicating the positions of similar map elements or the images themselves. However, the display data is not limited to such data, and data of any type may be used as long as it distinguishably indicates similar map elements. For example, coordinate values indicating the positions of the camera corresponding to the map elements may be superimposed on the map image.

Modification 1-6

In the localization using the SLAM technology, at the start of the localization, there is no information related to the current position and orientation, and thus it is necessary to search for map elements similar to an image captured at the current position from a large number of map elements in the three-dimensional map information. In a case where the three-dimensional map information contains a plurality of map elements similar to the image captured at the starting point, there is a possibility that a map element different from the map element corresponding to the current position is incorrectly selected, which results in wrong position estimation in the localization. To avoid the above possibility, it is desirable to select the estimation start position such that there are no other map elements similar to the estimation start position.

The present modification provides a method of distinguishably presenting, to a user, a highly-reliable candidate for an estimation start position of the localization using the SLAM technology.

The present modification is different in processing in step S302 from the first embodiment described above with reference to FIG. 3, as described below.

That is, in step S302, based on the information determined in step S301, a map image is generated which shows a candidate for the start position of the localization. The map image may be generated by a method described below.

First, map elements which are not similar to any other map elements are extracted among from the plurality of map elements acquired in step S301. More specifically, map elements which have degrees of similarity with any other map elements smaller than a preset threshold value are extracted. In a case where no such map elements are found, the threshold value is increased and the above process is executed again.

Next, a map image is generated by the same method as that employed in step S302 according to the first embodiment. In this process of generating the map image, different pixel values are assigned to positions of map elements including images to which there are other images similar or line segments connecting those positions, positions of map elements including images to which there is no other image similar or line segments connecting those positions, and positions other than the positions of map elements. For example, gray pixel values are assigned to the positions of map elements including images to which there are other images similar or line segments connecting those positions, black pixel values are assigned to the positions of the map elements including images to which there is no other image similar, and white pixel values are assigned to the positions other than the positions of map elements.

Figure 6:
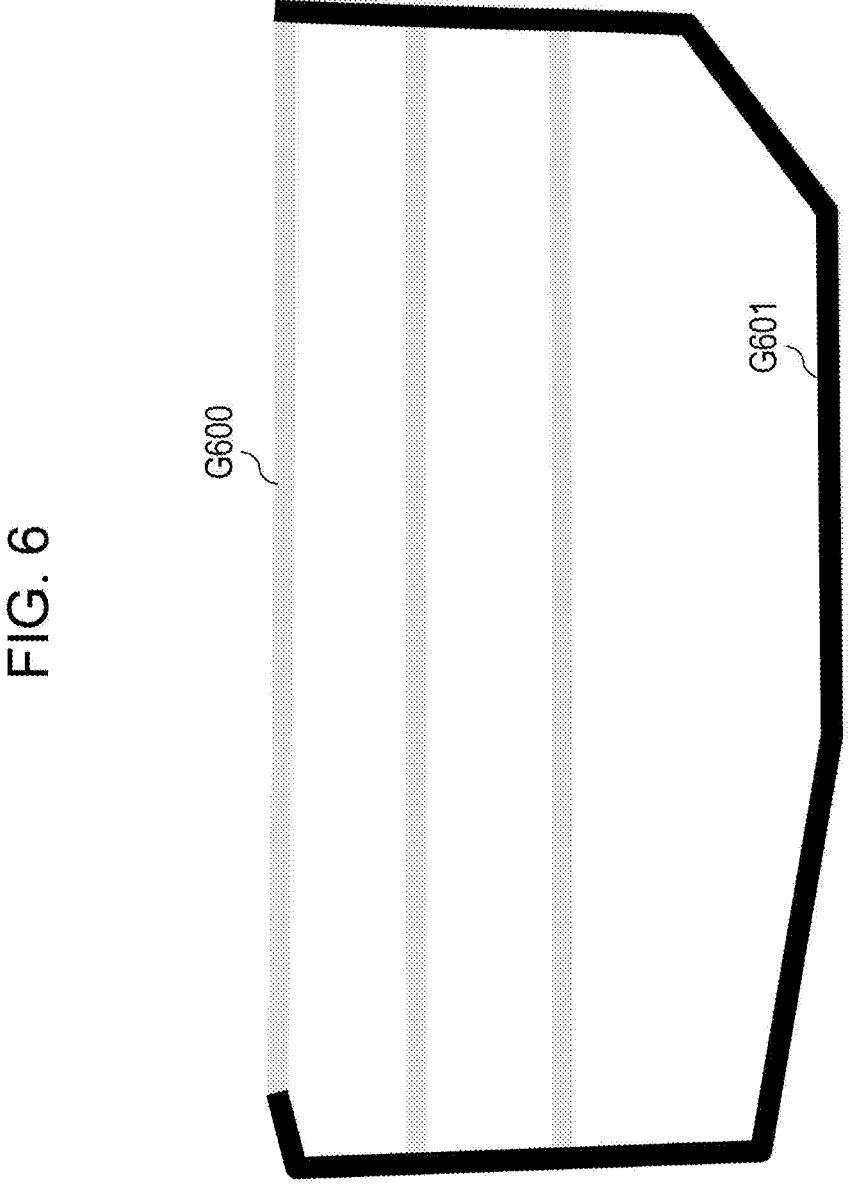
FIG. 6 shows a third example of a generated image.

An example of an image is shown in FIG. 6. G600 denotes line segments connecting camera positions where similar map elements exist. More specifically, in this example, among a plurality of paths existing, paths G600 are such paths whose layouts seen in the horizontal direction are similar to other paths. Each of three parallel line segments G600 indicates positions on each path. G601 denotes line segments whose endpoints indicate camera positions corresponding to map elements to which there are no other map elements similar, that is, candidates for the start position of the localization.

Alternatively, the image may be generated such that the image represents the number of similar map elements instead of the presence/absence of similar map elements. For example, the smaller the number, the darker the color.

By applying the method according to the present modification, it becomes possible for the user to know in advance a position suitable for starting the localization. This makes it possible to suppress an occurrence of wrong position estimation in the localization at the start of the localization.
Modification 1-7

In the localization using the SLAM technology, the localization fails if there is no map element that contains an image partially similar to an image captured at the current position. One method of recovering from this situation is to move the camera to a position corresponding to a map element where it is possible to capture an image which partially similar to another existing image, and restarting the localization at this position. However, in a case where there are a plurality of map elements including images similar to the image captured at the recovery position, there is a possibility that a map element different from a map element corresponding to the current position is selected, and thus wrong position estimation occurs in the localization at the recover position. To avoid the above situation, it is desirable to select, as the recovery start position, a position which is close to the position of the failure in the localization and which corresponds to a map element to which there is no other map element similar.

The present modification provides a method of presenting a user with a candidate for a recovery position in the localization using the SLAM technique.

The present modification is different in processing in step S302 from the first embodiment described above with reference to FIG. 3, as described below.

In step S302, based on the information determined in step S301, an image is generated which indicates a candidate for a recovery position when the localization fails. The image may be generated as follows. First, from the plurality of map elements acquired in step S300, map elements are extracted which are in the vicinity of the immediately previous position where the localization failed. The range of the vicinity is defined in advance. Next, from the extracted map elements, map elements are further extracted whose degrees of similarity with other map elements are all smaller than a predetermined threshold value. In a case where no such map elements are found, the threshold value is increased and the above process is executed again. The map elements extracted here are referred to as map elements which are not similar to any other map elements.

Figure 7:
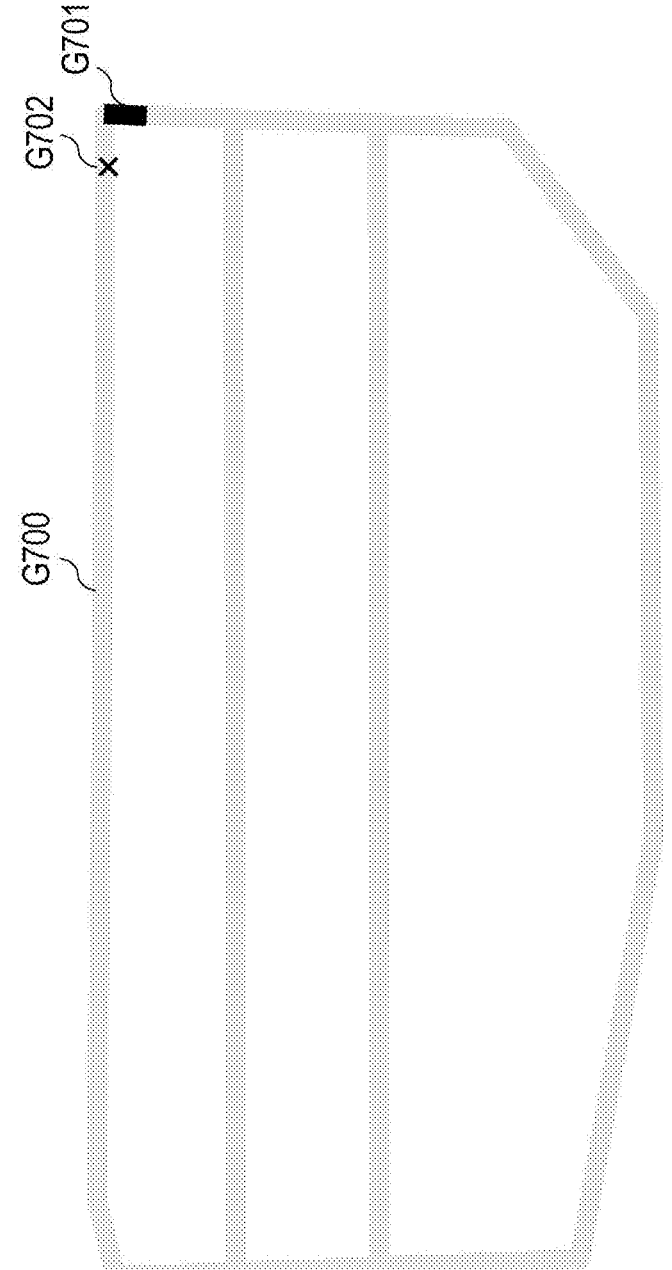
FIG. 7 shows a fourth example of a generated image.

Next, a map image is generated by the same method as that employed in step S302 according to the first embodiment. In the generation of the map image, different pixel values are assigned to camera positions where images are captured which are included in map elements to which there are no other map elements similar or line segments connecting such positions, the other camera positions or line segments connecting such other camera positions, and positions other than the camera positions. For example, black pixel values are assigned to the camera positions where images are captured which are included in map elements to which there are no other map elements similar or line segments connecting such positions, gray pixel values are assigned to the other camera positions, white pixel values are assigned to the positions other than the camera positions. An example of an image is shown in FIG. 7. G700 denotes line segments connecting camera positions corresponding to map elements to which there are other map elements similar, and G702 denotes an immediately previous position where the localization failed. G701 denotes a line segment whose endpoint indicates a camera position which is in the vicinity of the immediately previous position where the localization failed and which corresponds to an map element to which there is no other map element similar, that is, a candidate for a recovery position. Also, the image may be generated such that the image represents the number of similar map elements instead of the presence/absence of similar map elements. For example, the lower the number of similar map elements, the darker the color of the position in the vicinity of the immediately previous position where the localization failed.

In the example described above, from the map elements in the vicinity of the immediately previous position where the localization failed, a search is made for map elements to which there are no other similar map elements. Also, a search may be made for map elements containing images that are dissimilar to the image captured at the current camera position.

By applying the method according to the present modification, it becomes possible for the user to know an appropriate recovery position when the localization fails. This makes it possible to easily suppress wrong position estimation in the localization when recovery from a failure in the localization is performed.
Modification 1-8

The first embodiment has disclosed a method of displaying, in an easily-understandable manner, positions where wrong position is likely to be estimated in the localization. Each map element includes not only the position of the camera where an image included in the map element is captured, but also the orientation of the camera. Therefore, in S301, a determination is made as to a position and an orientation in which wrong position is likely to be estimated in the localization.

The present disclosure can also be realized by executing processing described below. That is, a program (software) for realizing one or more functions of the above-described embodiments is supplied to a system or apparatus via a network or a storage medium of a proper type, and the program is read and executed by a computer (a CPU, an MPU, or the like) of the system or the apparatus. The program may be stored in a computer-readable storage medium, and the computer-readable storage medium may be provided thereby providing the program.

According to the present disclosure, it is possible to clearly indicate a position where wrong position is likely to be estimated in the localization.
Modification 1-9

In the first embodiment, a description has been given of clearly indicating a position where wrong position estimation is likely to occur in localization. Instead of the self-position, a position at which the self-orientation can easily be determined as wrong may be indicated. A position where it is easy to determine that the self-orientation is wrong is, for example, a crossroads where the same scenery continues and a passage intersects. At this position, the position can be estimated correctly, but the orientation may be estimated in the opposite direction to the correct one. In step S301, positions at which self-orientation estimation is likely to fail(self-orientation estimation is wrong) are positions indicated by map elements with different orientations among map elements that are determined to be similar when the distance threshold between map elements is set to near zero.

OTHER EMBODIMENTS

Some embodiment(s) can also be realized by a computer of a system or apparatus that reads out and executes computer-executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer-executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer-executable instructions. The computer-executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has described exemplary embodiments, it is to be understood that some embodiments are not limited to the disclosed exemplary embodiments. The scope of the following claims is to be accorded the broadest interpretation so as to encompass all such modifications and equivalent structures and functions.

This application claims priority to Japanese Patent Application No. 2021-194639, which was filed Nov. 30, 2021 and which is hereby incorporated by reference herein in its entirety.

What is claimed is:

1. An information processing apparatus comprising:
one or more non-transitory computer-readable storage media; and
one or more processors in communication with the one or more non-transitory computer-readable storage media, wherein the one or more processors and the one or more non-transitory computer-readable storage media are configured to:
acquire a plurality of map elements from a storage unit storing three-dimensional map information based on the plurality of map elements, each of which includes an image captured by an imaging apparatus mounted on a vehicle and also includes position information indicating a position of the imaging apparatus at which the image was captured;
determine whether the position indicated by the position information included in a specific first map element, of the plurality of map elements, and the position indicated by the position information included in one or more second map elements of the plurality of map elements, are separated by at least a predetermined distance;
determine whether a similarity between an image feature of the image included in the specific first map element and an image feature of the image included in the one or more second map elements is equal to or greater than a threshold value; and
in a case where the position indicated by the position information included in the specific first map element and the position indicated by the position information included in the one or more second map elements are separated by at least the predetermined distance and where the similarity between the image feature of the image included in the specific first map element and the image feature of the image included in the one or more second map elements is equal to or greater than the threshold value, generate display data for displaying, in a manner different from other map elements, that an association exists between the position indicated by the position information included in the specific first map element and the position indicated by the position information included in at least one of the one or more second map elements such that the displaying indicates that, when the imaging apparatus is at the position indicated by the position information included in the specific first map element, in a re-localization process, the position indicated by the position information included in the specific first map element and the position indicated by the position information included in the at least one of the one or more second map elements are candidates for estimation as the position of the imaging apparatus.

2. The information processing apparatus according to claim 1, wherein the display data displays a computer graphics mark that is superimposed on a map image representing a layout of objects existing in an environment in which the respective images included in the plurality of map elements were captured such that the computer graphics mark corresponds to the position indicated by the position information included in the at least one of the one or more second map elements.

3. The information processing apparatus according to claim 1, wherein the display data displays a computer graphics mark that is superimposed on a map image in which the respective positions indicated by the respective position information included in the plurality of map elements are connected by lines based on a temporal order in which the respective images included in the plurality of map elements are captured, such that the computer graphics mark corresponds to the position indicated by the position information included in the at least one of the one or more second map elements.

4. The information processing apparatus according to claim 3, wherein the display data displays one or more computer graphics marks on the map image such that each of the one or more computer graphics marks is commonly given to a map element group in which images included in the plurality of map elements are similar to each other.

5. The information processing apparatus according to claim 3, wherein the display data displays computer graphics marks that are superimposed on the map image at positions corresponding to the position indicated by the position information included in the specific first map element and the position indicated by the position information included in the at least one of the one or more second map elements.

6. The information processing apparatus according to claim 3, wherein display data displays one or more computer graphics marks on the map image such that the one or more computer graphics marks indicate rankings of respective similarities between the image included in the specific first map element of the plurality of map elements and the respective images included in other map elements of the plurality of map elements.

7. The information processing apparatus according to claim 1, wherein the display data further displays that, when the imaging apparatus is at the position indicated by the position information included in the at least one of the one or more second map elements, the re-localization process may estimate the imaging apparatus to be at the position indicated by the position information included in the specific first map element.

8. The information processing apparatus according to claim 1, wherein each of the images included in the plurality of map elements is a respective image of an environment of a factory, and wherein the vehicle is an AGV (Automatic Guides Vehicle).

9. An information processing method comprising:

acquiring a plurality of map elements from a storage unit storing three-dimensional map information based on the plurality of map elements, each of which includes an image captured by an imaging apparatus mounted on a vehicle and also includes position information indicating a position of the imaging apparatus at which the image was captured;

determining whether the position indicated by the position information included in a specific first map element, of the plurality of map elements, and the position indicated by the position information included in one or more second map elements, of the plurality of map elements, are separated by at least a predetermined distance;

determining whether a similarity between an image feature of the image included in the specific first map element and an image feature of the image included in the one or more second map elements is equal to or larger than a threshold value; and in response to determining that the position indicated by the position information included in the specific first map element and the position indicated by the position information included in the one or more second map elements are separated by at least the predetermined distance and determining that the similarity between the image feature of the image included in the specific first map element and the image feature of the image included in the one or more second map elements is equal to or greater than the threshold value, generating display data for displaying, in a manner different from other map elements, that an association exists between the position indicated by the position information included in the specific first map element and the position indicated by the position information included in at least one of the one or more second map elements such that the displaying indicates that, when the imaging apparatus is at the position indicated by the position information included in the specific first map element, in a re-localization process, the position indicated by the position information included in the specific first map element and the position indicated by the position information included in the at least one of the one or more second map elements are candidates for estimation as the position of the imaging apparatus.

10. A non-transitory computer-readable storage medium storing a computer-executable program for causing a computer to perform the method according to claim 9.

* * * * *